United States Patent
Nakahara et al.

(10) Patent No.: US 11,634,547 B2
(45) Date of Patent: Apr. 25, 2023

(54) WATER-SOLUBLE FILM, PRODUCTION METHOD THEREOF, AND CHEMICAL AGENT PACKAGE

(71) Applicant: Mitsubishi Chemical Corporation, Tokyo (JP)

(72) Inventors: Kouichirou Nakahara, Tokyo (JP); Toshiya Ichiki, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/030,427

(22) Filed: Sep. 24, 2020

(65) Prior Publication Data

US 2021/0009773 A1    Jan. 14, 2021

Related U.S. Application Data

(63) Continuation of application No. PCT/JP2019/013857, filed on Mar. 28, 2019.

(30) Foreign Application Priority Data

Mar. 29, 2018  (JP) .............................. JP2018-063961

(51) Int. Cl.
| | | |
|---|---|---|
| *C11D 17/04* | (2006.01) | |
| *C11D 3/37* | (2006.01) | |
| *B65D 65/46* | (2006.01) | |
| *C08J 5/18* | (2006.01) | |
| *C08L 29/04* | (2006.01) | |

(52) U.S. Cl.
CPC ................. *C08J 5/18* (2013.01); *C08L 29/04* (2013.01); *C11D 17/043* (2013.01); *C08J 2329/04* (2013.01); *C08L 2203/16* (2013.01)

(58) Field of Classification Search
None
See application file for complete search history.

(56) References Cited

U.S. PATENT DOCUMENTS 2,948,697 A * 8/1960 Robertson .............. C08K 5/521
                                                    524/557
3,985,849 A * 10/1976 Notomi ................... B29C 48/03
                                                    264/211

| | | | |
|---|---|---|---|
| 2002/0000164 A1 | 1/2002 | Mizutani et al. | |
| 2004/0092635 A1* | 5/2004 | Kitamura ................... | C08J 5/18 524/386 |
| 2016/0102278 A1* | 4/2016 | Labeque ..................... | C08J 5/18 510/513 |
| 2018/0051145 A1* | 2/2018 | McInnis ..................... | C08J 5/18 |
| 2018/0251613 A1 | 9/2018 | Hiura et al. | |
| 2018/0251614 A1* | 9/2018 | Hiura ................... | B29C 41/003 |
| 2018/0265656 A1 | 9/2018 | Oda et al. | |

FOREIGN PATENT DOCUMENTS

| | | | |
|---|---|---|---|
| JP | 6138321 A | * | 5/1994 |
| JP | H06-138321 A | | 5/1994 |
| JP | 2001329130 A | | 11/2001 |
| JP | 2002030162 A | | 1/2002 |
| JP | 2002273791 A | | 9/2002 |
| JP | 2002301899 A | | 10/2002 |
| JP | 2009051947 A | | 3/2009 |
| WO | WO-2017043508 A1 | | 3/2017 |
| WO | WO-2017043509 A1 | | 3/2017 |

OTHER PUBLICATIONS

Extended European Search Report dated Apr. 22, 2021 in Patent Application No. 19776390.7, 9 pages.
International Preliminary Report on Patentability and Written Opinion dated Oct. 8, 2020 in PCT/JP2019/013857 (English translation only), 7 pages.
International Search Report dated Jul. 2, 2019 in PCT/JP2019/013857 (with English translation), 5 pages.
Combined Chinese Office Action and Search Report dated Apr. 24, 2022 in Patent Application No. 201980017808.1 (with English translation), 16 pages.
Office Action dated Aug. 23, 2022 in Japanese Patent Application No. 2019-517448 (with English translation), 5 pages.
Office Action dated Nov. 14, 2022 in Chinese Patent Application No. 201980017808.1 (with English translation), 15 pages.

* cited by examiner

*Primary Examiner* — Lorna M Douyon
(74) *Attorney, Agent, or Firm* — Element IP, PLC

(57) ABSTRACT

A water-soluble film is provided, which is less susceptible to curling even after long-term storage. The water-soluble film includes a polyvinyl alcohol resin (A), and has a first surface, which has a crystal Unity index Xa, and a second surface, which is opposite to the first surface and has a crystallinity index Xb, where: Xa≥Xb; Xa−Xb is from 0.015 to 0.10; and the crystallinity indexes Xa and Xb are measured through an infrared spectroscopic analysis by an attenuated total reflection method and represented by: $ABS_{1141}/ABS_{1093}$, wherein $ABS_{1141}$ and $ABS_{1093}$ are absorbances at wavenumbers of 1141 $cm^{-1}$ and 1093 $cm^{-1}$, respectively.

17 Claims, 1 Drawing Sheet

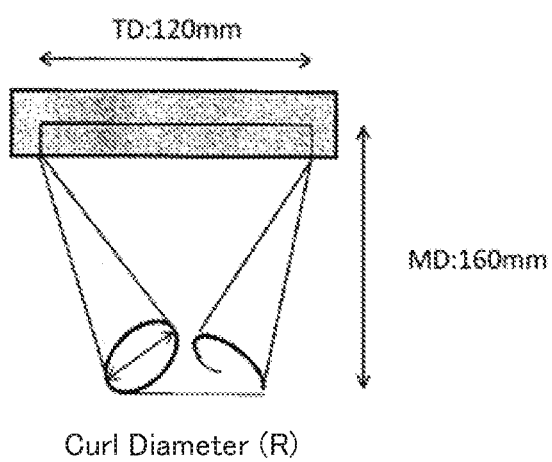

WATER-SOLUBLE FILM, PRODUCTION METHOD THEREOF, AND CHEMICAL AGENT PACKAGE

RELATED APPLICATION

This application is a continuation of International Application No. PCT/JP2019/013857, filed on Mar. 28, 2019, which claims priority to Japanese Patent Application No. 2018-063961, filed on Mar. 29, 2018, the entire contents of each of which being hereby incorporated by reference.

TECHNICAL FIELD

The present disclosure relates to a water-soluble film containing a polyvinyl alcohol resin as a major component. More specifically, the present disclosure relates to a water-soluble film which is less susceptible to curling even after long-term storage thereof, and further relates to a water-soluble film production method and a chemical agent package.

BACKGROUND ART

Polyvinyl alcohol films are formed from polyvinyl alcohol resins which are thermoplastic and yet water-soluble. The polyvinyl alcohol films are significantly different in various film physical properties and texture from hydrophobic films such as polyethylene terephthalate films and polyolefin films which are generally used as packaging films.

Conventionally, chemical agent portion packages (unit packages) have been proposed which each include a bag formed from a polyvinyl alcohol resin film and a chemical agent such as agricultural chemical or detergent contained in the bag, taking advantage of the water solubility of the polyvinyl alcohol resin. The unit packages are used in a wide variety of applications.

Known examples of water-soluble films to be used in such applications include: a water-soluble film which contains a polyvinyl alcohol resin as a major component, and a relatively great proportion of a plasticizer including a higher melting point plasticizer and a lower melting point plasticizer (see, for example, PTL 1); and a water-soluble film which is excellent in solubility and less susceptible to the curling (see, for example, PTL 2).

RELATED ART DOCUMENTS

Patent Documents

PTL 1: WO2017/043508
PTL 2: WO2017/043509

SUMMARY

The water-soluble film disclosed in PTL 1 can provide a package excellent in appearance without deterioration in mechanical properties and tension over time, but is liable to curl depending on production conditions. When the package is produced by using the water-soluble film, for example, the curling of the water-soluble film makes it difficult to handle the film, and reduces the productivity of the package because the film is liable to displace during sealing thereof. Therefore, the water-soluble film requires further improvement.

The water-soluble film disclosed in PTL 2 is produced through heat treatment thereof at 95° C. to 135° C. after drying, whereby the curling is suppressed after the film is allowed to stand still at 23° C. at 40% RH for 24 hours. However, the water-soluble film still suffers from the curling when being stored for a prolonged period in a product warehouse or the like. Therefore, the water-soluble film requires further improvement.

In view of the foregoing, the present disclosure provides a water-soluble film that is less susceptible to the curling even after long-term storage thereof.

The inventors conducted intensive studies in view of the foregoing. In detailed investigation into a causal relationship between the crystalline states of opposite surface portions of the polyvinyl alcohol film and the curling, the inventors found that, where a difference in crystallinity index (crystallization degree) between the opposite surface portions of the water-soluble film significantly greater than in the conventional cases, the aforementioned object can be achieved.

According to one aspect of the present disclosure, there is provided a water-soluble film which contains a polyvinyl alcohol resin (A), and has opposite surfaces each having a crystallinity index X represented by the following expression (1) based on measurement through an infrared spectroscopic analysis by an attenuated total reflection method, wherein one of the opposite surfaces of the film has a crystallinity index Xa and the other surface of the film has a crystallinity index Xb (Xa≥Xb), and a difference Xa−Xb between the crystallinity indexes Xa and Xb of the opposite film surfaces is 0.015 to 0.10:

$$X = ABS_{1141}/ABS_{1093} \quad (1)$$

wherein $ABS_{1141}$ is an absorbance at a wavenumber of 1141 cm$^{-1}$, and $ABS_{1093}$ is an absorbance at a wavenumber of 1093 cm$^{-1}$.

The present disclosure further provides a water-soluble film production method including rum steps of: forming polyvinyl alcohol film containing a polyvinyl alcohol resin (A); coating a surface of the polyvinyl alcohol film with water; and heat-treating the resulting polyvinyl alcohol film.

The water-soluble film of the present disclosure is less susceptible to the curling when being used for production of a package after being stored for a prolonged period. Therefore, the water-soluble film allows for proper sealing substantially without displacement, so that the package can be produced with a higher productivity. The water-soluble film is usable for various packaging applications, and is particularly useful for unit packaging applications for packaging chemical agents and the like.

Where the water-soluble film of the present disclosure further contains a plasticizer (B), the film is more flexible. Therefore, the water-soluble film has an improved formability when being used for production of a chemical agent package.

Where the plasticizer (B) is present in a proportion of not less than 5 parts by weight based on 100 parts by weight of the polyvinyl alcohol resin (A) in the water-soluble film of the present disclosure, a package produced by packaging a liquid such as a liquid detergent with the water-soluble film has shape stability over time without reduction in the toughness of the water-soluble film.

Where the water-soluble film of the present disclosure further contains a filler (C), the water-soluble film is excellent in antiblocking property.

Where the filler (C) is present in a proportion of 1 to 30 parts by weight based on 100 parts by weight of the polyvinyl alcohol resin (A) in the water-soluble film of the present disclosure, the water-soluble film is excellent not only in antiblocking property but also in flexibility and toughness.

Where the polyvinyl alcohol resin (A) includes an anion group-modified polyvinyl alcohol resin (a1) in the water-soluble film of the present disclosure, the water-soluble film is more excellent in solubility.

The present disclosure further provides a chemical agent package which includes a package bag formed from the water-soluble film of the present disclosure, and a chemical agent packaged in the package bag. In this case, the chemical agent can be used without rupture of the package.

Where the chemical agent is a detergent in the chemical agent package the present disclosure, the chemical agent package can be more easily used without the need for measuring the amount of the detergent.

Where the chemical agent is a liquid detergent in the chemical agent package of the present disclosure, the chemical agent package can be still more easily used without contaminating the surroundings with the liquid detergent.

In the water-soluble film production method of the present disclosure including the steps of forming the polyvinyl alcohol film containing the polyvinyl alcohol resin (A), coating the surface of the polyvinyl alcohol film with water, and heat-treating the resulting polyvinyl alcohol film, the surface of the dried polyvinyl alcohol film is coated with water, and then heat-treated. Thus, the opposite surfaces of the film are imparted with different crystal whereby a swelling effect and a shrinking effect are properly balanced on the opposite film surfaces. This supposedly suppresses the curling of the water-soluble film for a prolonged period.

BRIEF DESCRIPTION OF DRAWING

FIG. 1 is an explanatory diagram for a curling evaluation method.

DESCRIPTION OF EMBODIMENTS

Embodiments of the present disclosure will hereinafter be described specifically.

The water-soluble film of the present disclosure is a film containing a polyvinyl alcohol resin (A) and having opposite surfaces that are different in crystallinity index from each other.

A main feature of the present disclosure is that the swelling effect and the shrinking effect are properly balanced on the opposite surfaces of the film by providing a specific difference in crystallinity index between the opposite film surfaces to thereby suppress the curling of the water-soluble film for a prolonged period.

Hereinafter, the polyvinyl alcohol is often abbreviated as PVA, and the film containing the polyvinyl alcohol resin as the major component is often referred to as PVA film. Further, the water-soluble film containing the polyvinyl alcohol resin as the major component is often referred to as PVA water-soluble film.

In the present disclosure, the film surface(s) means at least one of front and back surfaces of the film excluding thickness surfaces of the film.

More specifically, where the crystallinity indexes X of the opposite surfaces of the water-soluble film represented by the following expression (1) are determined based on measurement through an infrared spectroscopic analysis by an attenuated total reflection method (ATR method), the crystallinity indexes X of the opposite surfaces of the water-soluble film satisfy a requirement that a difference Xa−Xb between the crystallinity index Xa of one of the opposite surfaces and the crystallinity index Xb of the other surface (Xa≥Xb) is 0.015 to 0.10:

$$X = ABS_{1141}/ABS_{1093} \quad (1)$$

wherein $ABS_{1141}$ is an absorbance at a wavenumber of 1141 $cm^{-1}$, and $ABS_{1093}$ is an absorbance at a wavenumber of 1093 $cm^{-1}$.

The determination of the crystallinity indexes X of the film surfaces represented by the above expression (1) based on the measurement through the infrared spectroscopic analysis by the attenuated total reflection method (ATR method) will be first described.

In the present disclosure, the infrared spectroscopic analysis is an analysis method for measuring an infrared absorption spectrum by a single reflection ATR method utilizing attenuated total reflection. In this analysis method, an ATR prism having a higher refractive index is brought into intimate contact with a sample, and infrared radiation is applied to the sample through the ATR prism. Then, light outputted from the ATR prism is spectrally analyzed.

In the infrared spectroscopic analysis by the attenuated total reflection method (ATR method), the sample is simply brought into intimate contact with the ATR prism, whereby a spectrum can be easily measured. It is generally known that the depth of penetration at an incident angle of 45 degrees through a diamond ATR crystal at around 1000 $cm^{-1}$ is about 2 μm. This makes it possible to evaluate the PVA crystallinities of the film surface portions.

The crystallinity indexes X of the PVA film surfaces each mean the ratio of absorbance at 1141 $cm^{-1}$ to absorbance at 1093 $cm^{-1}$ the infrared absorption spectrum measured through the infrared spectroscopic analysis by the ATR method. It is known that an absorption peak at 1141 $cm^{-1}$ is attributable to skeletal vibrations of zigzag carbon chains extending in a PVA crystalline region, and corresponds to the crystalline band of the PVA. It is also known that the peak intensity at 1141 $cm^{-1}$ is increased with the increase in the crystallinity of the PVA. On the other hand, an absorption peak at 1093 $cm^{-1}$ is attributable to C—O stretching vibrations in the PVA, and the peak intensity at 1141 $cm^{-1}$ is normalized with reference to the peak intensity at 1093 $cm^{-1}$. Thus, the crystallinity indexes X of the film surfaces are calculated.

That is, a higher crystallinity index X indicates that the film surface portion has a higher crystallinity, and is less susceptible to dimensional change due to moisture absorption. In contrast, a lower crystallinity index X indicates that the film surface portion has a lower crystallinity, and is more susceptible to swelling, shrinkage, and other dimensional change due to moisture absorption.

[Method of Measuring Crystallinity Indexes X of Film Surfaces]

The crystallinity indexes X of the film surfaces are measured by the following method:

More specifically, a front surface and a back surface of a test piece of the water-soluble film cut to a size having a length of 160 mm and a width of 120 mm are each analyzed at five points (1: a 40-mm longitudinal and 30-mm transverse position, 2: a 40-mm longitudinal and 90-mm transverse position, 3: a 120-mm longitudinal and 30-mm transverse position, 4: a 120-mm longitudinal and 90-mm transverse position, 5: a 80-mm longitudinal and 60-mm transverse position) under the following conditions by the attenuated total reflection method (ATR method) by means of the following measurement apparatus. Thus, infrared absorption spectra are obtained.

Measurement apparatus: Fourier transform infrared spectrophotometer FT/IR-6600 (available from JASCO Corporation), and polarization-type single-reflection ATR measurement apparatus ATR PRO610P-S (available from JASCO Corporation)

ATR prism: PKS-D615P (available from JASCO Corporation) made of diamond, and having a sample contact area of 2.0 mm φ, and an incident angle (center) of 45 degrees Measurement method: Single-reflection ATR method Measurement wavenumber range: 4000 to 400 cm$^{-1}$ ATR correction: Done once by anomalous dispersion method in a range of 4000 to 400 cm$^{-1}$ at an incident angle of 45.0 degrees with the use of a prism (diamond) having a refractive index of 2.400 and a sample having a refractive index of 1.500 with zero base correction effected Detector: DLATGS Beam splitter: Ge/KBr Resolution: 4 cm$^{-1}$ Cumulative number: 32 (16 for background measurement)

The absorbance ($ABS_{1141}$) dependent on the crystallinity of the PVA and the absorbance ($ABS_{1093}$) as the reference for the PVA are determined in the following manner based on each of the infrared absorption spectra thus obtained.

The absorbance $ABS_{1141}$ at a wavenumber of 1141 cm$^{-1}$ is defined as a maximum absorbance difference ((measured absorbance)−(base line absorbance)) between a portion of an infrared absorption spectrum curve in a wavenumber range of 1141 cm$^{-1}$±7.5 cm$^{-1}$ and a base line extending from a minimum absorption position of the infrared absorption spectrum curve at a wavenumber of 1163 cm$^{-1}$±7.5 cm$^{-1}$ and a minimum absorption position of the infrared absorption spectrum curve at a wavenumber of 993 cm$^{-1}$±7.5 cm$^{-1}$.

The absorbance $ABS_{1093}$ at a wavenumber of 1093 cm$^{-1}$ is defined as a maximum absorbance difference ((measured absorbance)−(base line absorbance)) between a portion of the infrared absorption spectrum curve in a wavenumber range of 1093 cm$^{-1}$±7.5 cm$^{-1}$ and the base line extending from the minimum absorption position the infrared absorption spectrum curve at a wavenumber of 1163 cm$^{-1}$±7.5 cm$^{-1}$ and the minimum absorption position of the infrared absorption spectrum curve at a wavenumber of 993 cm$^{-1}$±7.5 cm$^{-1}$.

Crystallinity indexes X at the five points on the front surface and crystallinity indexes X at the five points on the back surface are calculated based on the absorbance $ABS_{1141}$ and $ABS_{1093}$ obtained through the above measurement, and the crystallinity indexes Xa and Xb (Xa≥Xb) of the PVA water-soluble film surfaces are each calculated based on an average of the crystallinity indexes at the five points.

Where the crystallinity index of the film front surface is higher than the crystallinity index of the film back surface, the crystallinity index of the film front surface is represented by Xa, and the crystallinity index of the film back surface is represented by Xb. Where the crystallinity index of the film front surface lower than the crystallinity index of the film back surface, the crystallinity index of the film back surface is represented by Xa, and the crystallinity index of the film front surface is represented by Xb. Where the crystallinity index of the film front surface equals to the crystallinity index of the film back surface, Xa−Xb=0.

Where the crystallinity indexes X of the opposite surfaces of the water-soluble film of the present disclosure represented by the following expression (1) are determined based on the measurement through the infrared spectroscopic analysis by the attenuated total reflection method (ATR method), the crystallinity indexes X of the opposite surfaces of the film satisfy the requirement that the difference Xa−Xb between the crystallinity index Xa of one of the opposite surfaces and the crystallinity index Xb of the other surface (Xa≥Xb) is 0.015 to 0.10:

$$X = ABS_{1141}/ABS_{1093} \quad (1)$$

wherein $ABS_{1141}$ is an absorbance at a wavelength of 1141 cm$^{-1}$, and $ABS_{1093}$ is an absorbance at a wavelength of 1093 cm$^{-1}$.

The crystallinity index difference Xa−Xb falls within a range of 0.015 to 0.10, preferably 0.020 to 0.080, more preferably 0.030 to 0.060.

If the difference Xa−Xb is excessively small, the film tends to curl when being stored for a prolonged period, failing to provide the effects of the present disclosure. If the difference Xa−Xb is excessively great, the film tends to be poorer in sealability, printability, and other surface physical properties.

The water-soluble film satisfying the requirement that the difference Xa−Xb between the crystallinity indexes of the opposite film surfaces may be produced, for example, by dissolving a film formation material including the PVA resin (A) to prepare a solution, casting and drying the solution to prepare a PVA film, and then performing a moist heat treatment on the PVA film. Exemplary methods for the moist heat treatment include: (i) a method in which a surface of the dried PVA film coated with water, and then the resulting PVA film is heat-treated; (ii) a method in which the dried PVA film is immersed in water in a water vessel, and then the resulting PVA film is heat-treated; (iii) a method in which the dried PVA film is moisture-conditioned in a chamber kept at a higher humidity, and then the resulting PVA film is heat-treated; and, (iv) a method in which the water treatment and the heat treatment are simultaneously performed on the dried PVA film through a steam treatment in a steam chamber kept at a higher temperature.

Of these methods, the method (i) is preferred because only one of the opposite surfaces of the film can be easily treated for the crystallinity control. The method (i) will be detailed later.

The water-soluble film of the present disclosure contains the PVA resin (A) as the major component.

The PVA resin (A) to be used in the present disclosure may be an unmodified PVA or a modified PVA resin, and is preferably the modified PVA resin.

Two or more PVA resins which are different in at least one of saponification degree, viscosity, modifying group, and modification degree may be used in combination. More specifically, two or more unmodified PVAs may be used in combination, or two or more modified PVA resins may be used in combination. Further, two or more unmodified PVAs and modified PVA resins may be used in combination.

In the present disclosure, the major component means a component present in a proportion of not less than 50 wt. %, preferably not less than 55 wt. %, particularly preferably not less than 60 wt. %, based on the overall weight of the water-soluble film, and means that the water-soluble film may be entirely made of the PVA resin (A).

The unmodified PVA is prepared by polymerizing a vinyl ester compound and saponifying the resulting polyvinyl ester resin, and mainly contains a vinyl alcohol structural unit. The unmodified PVA contains the vinyl alcohol structural unit in a proportion corresponding to a saponification degree, and further contains a vinyl ester structural unit left unsaponified.

Examples of the vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Particularly, vinyl acetate is preferably used as the vinyl ester compound. The aforementioned vinyl ester compounds may be used alone or in combination.

A known polymerization method such as solution polymerization method, emulsion polymerization method or suspension polymerization method may be used for copolymerization of the vinyl ester compound and an unsaturated monomer copolymerizable with the vinyl ester compound. A solution polymerization method using an alcohol such as methanol, ethanol or isopropyl alcohol as a solvent is typically employed.

The modified PVA resin is prepared by introducing a modifying group into a resin mainly containing a vinyl alcohol structural unit and prepared saponifying a polyvinyl ester resin prepared by polymerization of a vinyl ester compound through copolymerization, post reaction or the like. The modified PVA resin contains the vinyl alcohol structural unit in a proportion corresponding to the saponification degree, and further contains a vinyl ester structural unit left unsaponified, and an unsaturated monomer structural unit introduced by the copolymerization or a structural unit introduced by the post reaction.

Examples of the vinyl ester compound include those described above for the unmodified PVA for the PVA resin (A).

The modified PVA resin prepared by the copolymerization (copolymerization-modified PVA resin) may be prepared by copolymerizing the vinyl ester compound and the unsaturated monomer copolymerizable with the vinyl ester compound and then saponifying the resulting copolymer.

Examples of the unsaturated monomer copolymerizable with the vinyl ester compound include those obtained by copolymerization with: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, and salts, monoesters, and dialkyl esters of these unsaturated acids; nitriles such as acrylonitrile and methacrylonitrile; amides such as acrylamide and methacrylamide; olefin sulfonic acids such as ethylenesulfonic acid, allylsulfonic acid, and methallylsulfonic acid, and salts of these olefin sulfonic acids; alkyl vinyl ethers; N-acrylamide methyl trimethylammonium chloride, allyltrimethylammonium chloride, dimethylallyl vinyl ketone, n-vinylpyrrolidone, vinyl chloride, and vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester, polyoxyethylene vinyl ether, polyoxypropylene vinyl ether, polyoxyethylene polyoxypropylene allylamine, polyoxyethylene vinylamine, and polyoxypropylene vinylamine; and hydroxyl-containing α-olefins such as 3-buten-1-ol, 4-penten-1-ol, and 5-hexen-1-ol, and acylation products and other derivatives of these hydroxyl-containing α-olefins. These may be used alone or in combination.

Examples of the modified PVA resin prepared by the post reaction (post-modified PVA resin) include modified PVA resin containing an acetoacetyl group introduced by a reaction with a diketene, modified PVA resin containing a polyalkylene oxide group introduced by a reaction with ethylene oxide, modified PVA resin containing a hydroxyalkyl group introduced by a reaction with an epoxy compound, and modified PVA resin prepared by allowing a PVA resin to react with an aldehyde compound having a functional group by esterification, acetalization, urethanization, etherification, grafting, phosphoric acid esterification, oxyalkylenation, or the like. These may be used alone or in combination.

The modified PVA resin preferably has a primary hydroxyl group in its side chain, and the number of primary hydroxyl groups in the side chain is typically 1 to 5, preferably 1 to 2, particularly preferably 1. Further, the modified PVA resin preferably has a secondary hydroxyl group in addition to the primary hydroxyl group. Examples of such a modified PVA resin include PVA resin having a hydroxyalkyl group in its side chain, and PVA resin having a 1,2-diol structural unit in its side chain.

In the present disclosure, an anionic group-modified PVA resin is preferably used as the modified PVA resin from the viewpoint of the solubility. Exemplary anionic groups for the anionic group-modified PVA resin include carboxyl group, sulfonic acid group, and phosphoric acid group. For chemical resistance and long-term stability, the carboxyl group and the sulfonic acid group are preferred, and the carboxyl group is particularly preferred.

A carboxyl-modified PVA resin as the modified PVA resin may be prepared by any method. Examples of the preparation method include: (I) a method in which a carboxyl-containing unsaturated monomer and a vinyl ester compound are copolymerized and then the resulting copolymer is saponified; and (II) a method in which a vinyl ester compound is polymerized in the presence of a carboxl containing alcohol, aldehyde or thiol as a chain transfer agent and the resulting polymer is saponified.

Examples of the vinyl ester compound to be used in the method (I) or (II) include those described above, and vinyl acetate is preferably used.

Examples of the carboxyl-containing unsaturated monomer to be used in the method (I) include ethylenically unsaturated dicarboxylic acids (maleic acid, fumaric acid, itaconic acid, and the like), ethylenically unsaturated dicarboxylic acid monoesters (monoalkyl maleates, monoalkyl fumarates, monoalkyl itaconates, and the like), ethylenically unsaturated dicarboxylic acid diesters (dialkyl maleates, dialkyl fumarates, dialkyl itaconates, and the like) which need conversion to carboxyl groups by hydrolysis in the saponification of the copolymer, ethylenically unsaturated carboxylic anhydrides (maleic anhydride, itaconic anhydride, and the like), ethylenically unsaturated monocarboxylic acids ((meth)acrylic acid, crotonic acid, and the like), and salts of these compounds, which may be used alone or in combination.

Of these, maleic acid, monoalkyl maleates, dialkyl maleates, maleic acid salts, maleic anhydride, itaconic acid, monoalkyl itaconates, dialkyl itaconates, (meth)acrylic acid, and the like are preferred, and maleic acid, monoalkyl maleates, dialkyl maleates, maleic acid salts, and maleic anhydride are particularly preferred. Further, monoalkyl maleates are more preferred.

In the method (II), a compound derived from a thiol having a greater chain transfer effect is particularly effective, and specific examples of the thiol-derived compound include mercaptoacetic acid, 2-mercaptopropionic acid, 3-mercaptopropionic acid, and 2-mercaptostearic acid.

The carboxyl-containing unsaturated monomer and the vinyl ester compound may be copolymerized with some other common monomer, long as the water solubility is not impaired. Examples of the common monomer include alkyl esters of ethylenically unsaturated carboxylic acids, allyl esters of saturated carboxylic acids, α-olefins, alkyl vinyl ethers, alkyl allyl ethers, (meth)acrylamide, (meth)acrylonitrile, styrene, and vinyl chloride, which may be used alone or in combination.

The preparation method for the carboxyl-modified PVA resin is not limited to the aforementioned methods. For example, a polyvinyl alcohol (a partially saponified product or a completely saponified product) may be allowed to post-react with a carboxyl-containing compound, such as dicarboxylic acid, aldehyde carboxylic acid or hydroxycarboxylic acid, having a functional group reactive with a hydroxyl group.

Where a PVA resin modified with a sulfonic acid group (sulfonic acid-modified PVA resin) is used, exemplary preparation methods for the sulfonic acid-modified PVA resin include: a method in which the vinyl ester compound is copolymerized with a comonomer such as vinylsulfonic acid, styrenesulfonic acid, allylsulfonic acid, methallylsulfonic acid or 2-acrylamido-2-methylpropanesulfonic acid, and the resulting copolymer is saponified; and a method in which vinylsulfonic acid or its salt, or 2-acrylamido-2-methylpropanesulfonic acid or its salt is introduced into the PVA by Michael addition.

The PVA resin (A) to be used in the present disclosure preferably has an average saponification degree of not less than 80 mol %, particularly preferably 82 to 99.8 mol %, more preferably 85 to 99.5 mol %. If the average saponification degree of the PVA resin (A) is excessively low, the solubility of the film tends to be reduced over time depending on the pH of a chemical agent to be packaged with the film.

The unmodified PVA to be used in the present disclosure preferably has an average saponification degree of not less than 80 mol %, particularly preferably 82 to 99 mol %, more preferably 85 to 90 mol %. If the average saponification degree of the unmodified PVA is excessively low, the water solubility tends to be reduced. If the average saponification degree of the unmodified PVA is excessively high, the water solubility also tends to be reduced.

The modified PVA resin to be used in the present disclosure preferably has an average saponification degree not less than 80 mol %, particularly preferably 85 to 99.9 mol %, more preferably 90 to 99.5 mol %. If the average saponification degree of the modified PVA resin is excessively low, the solubility of the film tends to be reduced over time depending on the pH of a chemical agent to be packaged with the film. If the average saponification degree of the modified PVA resin excessive high, the water solubility of the film tends to be significantly reduced due to a thermal history experienced during film formation.

Further, where the anionic group-modified PVA resin is used as the modified PVA resin, the anionic group-modified PVA resin preferably has an average saponification degree of not less than 85 mol %, particularly preferably 88 to 99.9 mol %, more preferably 90 to 99.8 mol %, especially preferably 92 to 99.5 mol %.

The average saponification degrees described above are measured in conformity with JIS K6726 3.5.

The polymerization degree of the PVA resin is generally express an aqueous solution Viscosity. The PVA resin (A) to used in the present disclosure preferably has a 4 wt. % aqueous solution viscosity of 10 to 50 mPa·s, more preferably 15 to 45 mPa·s, particularly preferably 20 to 40 mPa·s, as measured at 20° C. If the viscosity of the PVA resin (A) is excessively low, the mechanical strength of the film as a packaging material tends to be reduced. If the viscosity of the PVA resin (A) is excessively high, the aqueous solution viscosity tends to be higher during the film formation, thereby reducing the productivity of the film.

Where the unmodified PVA is used as the PVA resin (A), the unmodified PVA preferably has a 4 wt. % aqueous solution viscosity of 5 to 50 mPa·s, particularly preferably 10 to 45 mPa·s, more preferably 15 to 40 mPa·s, as measured at 20° C.

Where the modified PVA resin is used as the PVA resin (A), the modified PVA resin preferably has a 4 wt. % aqueous solution viscosity of 5 to 50 mPa·s, particularly preferably 10 to 45 mPa·s, more preferably 15 to 40 mPa·s, as measured at 20° C.

If the viscosity is excessively low, the mechanical strength of the water-soluble film as the packaging material tends to be reduced. If the viscosity is excessively high, on the other hand, the aqueous solution viscosity tends to be higher during the film formation, thereby reducing the productivity of the film. The 4 wt. % aqueous solution viscosities are measured in conformity with JIS K6726 3.11.2

The modified PVA resin to be used in the present disclosure preferably has a modification degree of 1 to 20 mol %, particularly preferably 1.5 to 15 mol %, more preferably 2 to 12 mol %. If the modification degree of the modified PVA resin is excessively low, the water solubility tends to be reduced. If the modification degree of the modified PVA resin is excessively high, the productivity and the biodegradability of the PVA resin tend to be reduced. Further, the blocking is liable to occur.

Where the anionic group-modified PVA resin is used as the modified PVA resin in the present disclosure, the anionic group-modified PVA resin preferably has a modification degree of 1 to 10 mol %, particularly preferably 1.5 to 9 mol %, more preferably 2 to 8 mol %. If the modification degree of the anionic group-modified PVA resin is excessively low, the water solubility tends to be reduced. If the modification degree of the anionic group-modified PVA resin is excessively high, the productivity and the biodegradability of the PVA resin tend to be reduced. Further, the blocking is liable to occur.

In the present disclosure, the PVA resin (A) preferably includes the unmodified PVA and the modified PVA resin from the viewpoint of the solubility and the strength of the film. Particularly, the PVA resin (A) preferably includes the unmodified PVA and the anionic group-modified PVA resin, and more preferably includes the unmodified PVA and the carboxyl-modified PVA resin.

Where the PVA resin (A) includes the unmodified PVA and the modified PVA resin, the weight ratio of the unmodified PVA to the modified PVA resin is preferably (unmodified PVA)/(modified PVA resin)=1/99 to 99/1, particularly preferably 5/95 to 95/5, more preferably 10/90 to 90/10.

From the viewpoint of the solubility, the water sealability, and other film physical properties, the weight ratio of the unmodified PVA to the modified PVA resin is preferably (unmodified PVA)/(modified PVA resin)=5/95 to 40/60, particularly preferably 6/94 to 30/70, more preferably 7/93 to 20/80. If the ratio of the unmodified PVA is excessively low, the water sealability tends to be deteriorated. If the ratio of the modified PVA resin is excessively low, the solubility tends to be reduced.

Where the PVA resin (A) includes the modified PVA resin and the unmodified PVA, the unmodified PVA preferably has a 4 wt. % aqueous solution viscosity of 5 to 50 mPa·s, particularly preferably 10 to 45 mPa·s, more preferably 12 to 40 mPa·s, especially preferably 15 to 35 mPa·s, as measured at 20° C. If the viscosity of the unmodified PVA is excessively low, the mechanical strength of the film as the packaging material tends to be reduced. If the viscosity of the unmodified PVA is excessively high, on the other hand, the aqueous solution viscosity tends to be higher during the film formation, thereby reducing the productivity of the film.

[Plasticizer (B)]

The PVA film of the present disclosure preferably further contains a plasticizer (B) so as to be imparted with flexibility and easy formability. The plasticizer (B) may include only one plasticizer, or may include two or more plasticizers. The plasticizer (B) preferably includes two or more plasticizers to impart the film as the packaging material with toughness or to impart a liquid detergent-containing package with long-term shape stability.

Examples of the plasticizer (B) include: glycerin compounds such as glycerin, diglycerin, and triglycerin; alkylene glycols such as triethylene glycol, polyethylene glycol, polypropylene glycol, and dipropylene glycol; ethers such as trimethylolpropane and dibutyl ether; carboxylic acids such as stearic acid, oleic acid, linoleic acid, linolenic acid, sorbic acid, citric acid, and adipic acid; ketones such as cyclohexanone; amines such as monoethanolamine, triethanolamine, ethylenediamine, and imidazole compounds; and amino acids such as alanine, glycine, aspartic acid, glutamic acid, histidine, lysine, and cysteine.

Sugar alcohols, monosaccharides, and polysaccharides are also usable, and examples thereof include: divalent alcohols such as salicyl alcohol, catechol, resorcinol, hydroquinone, bisphenol-A, bisphenol-F, and neopentyl glycol; trivalent alcohols such as phloroglucinol; tetravalent alcohols such as erythritol, threitol, and pentaerythritol; pentavalent alcohols such as xylitol, arabitol, fucitol, glucose, and fructose; hexavalent alcohols such as mannitol, sorbitol, and inositol; octavalent alcohols such as lactitol, sucrose, and trehalose; and nonavalent and higher-valent alcohols such as maltitol, which may be used alone or in combination.

From the viewpoint of a higher curling resistance and proper balance between the strength and the flexibility, glycerin and sorbitol are preferably used in combination.

In the present disclosure, the proportion of the plasticizer (B) is preferably not less than 5 parts by weight, particularly preferably 5 to 70 parts by weight, more preferably 8 to 60 parts by weight, especially preferably 10 to 50 parts by weight, based on 100 parts by weight of the PVA resin (A). If the proportion of the plasticizer (B) is excessively small, a liquid-containing package such as liquid detergent package tends to be deteriorated in long-term shape stability. If the proportion of the plasticizer (B) is excessively great, the film is liable to have a lower mechanical strength, and to suffer from blocking.

The weight ratio (glycerin/sorbitol) of glycerin to sorbitol is preferably 0.1 to 5, particularly preferably 0.2 to 4.5, more preferably 0.5 to 4, especially preferably 0.7 to 1.3. If the weight ratio is excessively low, the PVA film tends to be excessively soft, thereby suffering from blocking. If the weight ratio is excessively high, the PVA film tends to be excessively hard to be thereby brittle in a lower humidity environment.

As required, the film of the present disclosure preferably further contains a filler (C) and a surfactant (D).

The filler (C) is used to impart the film with an antiblocking property. Examples of the filler (C) include inorganic filler and organic filler. Of these, the organic filler is preferred. For improvement of the water sealability in package production, the organic filler and the inorganic filler are preferably used in combination.

The organic filler means organic compound particles (primary particles) in needle form, bar form, lamellar form, scale form, spherical form or any given form, or agglomerates (secondary particles) of the organic compound. particles.

The organic filler is mainly selected from polymer compounds. Examples of the polymer compounds include melamine resins, polymethyl (meth)acrylate resins, polystyrene resins, starch, polylactic acids, and other biodegradable resins, which may be used alone or in combination. Of these, biodegradable resins such as the polymethyl (meth)acrylate resins, the polystyrene resins, and the starch are preferred. Particularly, the starch preferred from the viewpoint of the dispersibility thereof in the PVA resin (A).

Examples of the starch include raw starches (corn starch, potato starch, sweet potato starch, wheat starch, cassava starch, sago starch, tapioca starch, sorghum starch, rice starch, pea starch, kudzu starch, bracken starch, lotus starch, water chestnut starch, and the like), physically modified starches (α-starch, fractionated amylose, moist heat-treated starch, and the like), enzyme-modified starches (hydrolyzed dextrin, enzyme-decomposed dextrin, amylose, and the like), chemically degraded starches (acid-treated starch, hypochlorous acid-oxidized starch, dialdehyde starch, and the like), chemically modified starch derivatives (esterified starch, etherified starch, cationized starch, crosslinked starch, and the like). Of these, the raw starches, particularly the corn starch and the rice starch, are preferably used from the viewpoint of availability and economy.

The organic filler preferably has an average particle diameter of 5 to 50 μm, particularly preferably 10 to 40 μm, more preferably 15 to 35 μm. If the average particle diameter is excessively small, the film is more liable to suffer from the blocking. If the average particle diameter is excessively great, the particles of the filler are liable to agglomerate to be thereby deteriorated in dispersibility. Further, the film tends to suffer from pinholes when being stretched in the film processing.

The average particle diameter of the organic filler is calculated based on a D50 value of cumulative volume distribution (a particle diameter for cumulative 50% of particles) measured by means of a particle size distribution measuring apparatus of laser diffraction type.

The inorganic filler means inorganic compound particles (primary particles) in needle form, bar form, lamellar form, scale form, spherical form or any given form, or agglomerates (secondary particles) of the inorganic compound particles.

Specific examples of the inorganic filler include oxide inorganic compounds such as silica (silicon dioxide), diatom earth, titanium oxide, calcium oxide, magnesium oxide, aluminum oxide, barium oxide, germanium oxide, tin oxide, and zinc oxide, talc, clay, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate, which may be used alone or in combination.

Of these, the oxide inorganic compounds and talc are preferred because of their excellent hydrogen bond effect with respect to the PVA resin (A) and their higher water sealability improving effect. Particularly, titanium oxide, talc, and silica are preferably used, and silica is more preferably used.

The inorganic filler preferably has an average particle diameter of 1 to 20 μm, particularly preferably 2 to 15 μm, more preferably 3 to 10 μm. If the average particle diameter is excessively small, the film is more susceptible to the blocking, and tends to be deteriorated in flexibility and toughness. If the average particle diameter is excessively great, it tends to be difficult to provide the water sealability improving effect.

The average particle diameter of inorganic filler is calculated based on a D50 value of cumulative volume distribution (a particle diameter for cumulative 50% of particles) measured by means of a particle size distribution measuring apparatus of laser diffraction type.

The proportion of the filler (C) is preferably 1 to 30 parts by weight, particularly preferably 2 to 25 parts by weight, more preferably 2.5 to 20 parts by weight, based on 100 parts by weight of the PVA resin (A). If the proportion of the filler (C) is excessively small, the film is more susceptible to the blocking. If the proportion of the filler (C) is excessively great, the film tends to be deteriorated in flexibility and toughness.

In the present disclosure, the surfactant (D) is used for improvement of the peelability of the PVA film when the film is removed from a cast surface in the production of the PVA film. A nonionic surfactant, a cationic surfactant or an anionic surfactant is typically used as the surfactant (D). Examples of the surfactant (D) include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers such as polyoxyethylene laurylamino ether and polyoxyethylene stearylamino ether, which may be used alone or in combination. Of these, the polyoxyalkylene alkyl ether phosphate monoethanolamine salts and polyoxyethylene laurylamino ether are preferred for stable production.

The proportion of the surfactant (D) is preferably 0.01 to 3 parts by weight, particularly preferably 0.05 to 2.5 parts by weight, more preferably 0.1 to 2 parts by weight, based on 100 parts by weight of the PVA resin (A). If the proportion of the surfactant (D) is excessively small, the PVA film tends to have poorer peelability when being removed from a cast surface of a film forming apparatus in the film production, thereby reducing the productivity. If the proportion of the surfactant (D) is excessively great, the water-soluble film tends to suffer from inconvenience such that the water-soluble film is liable to have a reduced adhesive strength when being sealed in production of a package.

In the present disclosure, the PVA film may contain additional water-soluble polymer (e.g., sodium polyacrylate, polyethylene oxide, polyvinyl pyrrolidone, dextrin, chitosan, chitin, methylcellulose, hydroxyethylcellulose or the like), perfume, rust preventing agent, colorant, bulking agent, defoaming agent, UV absorber, liquid paraffins, fluorescent brightener, and bitter component (e.g., denatonium benzoate or the like), as long as the object of the present disclosure is not impaired. These may be used alone or in combination.

In the present disclosure, the PVA film preferably further contains an antioxidant for suppression of yellowing. Examples of the antioxidant include sulfites such as sodium sulfite, potassium sulfite, calcium sulfite, and ammonium sulfite, tartaric acid, ascorbic acid, sodium thiosulfate, catechol, and Rongalite. Of these, the sulfites are preferred, and sodium sulfite is particularly preferred. The proportion of the antioxidant is preferably 0.1 to 10 parts by weight, particularly preferably 0.2 to 5 parts by weight, more preferably 0.3 to 3 parts weight, based on 100 parts by weight of the PVA resin (A).

<Production of Water-Soluble Film>

The water-soluble film of the present disclosure may be produced, for example, by the following method.

The water-soluble film of the present disclosure is produced by first forming a PVA film through a film formation process including a dissolution step for preparation of a film formation material containing the PVA resin (A), a casting step, and a drying step, and then treating the PVA film obtained after the drying step of the film formation process through the steps of: (i) coating a surface of the PVA film with water; and (ii) heat-treating the resulting film.

The respective steps will hereinafter be described more specifically.

[Dissolution Step]

In the dissolution step, a PVA resin composition containing the PVA resin (A), preferably further containing the plasticizer (B) and, as required, further containing the filler (C), the surfactant (D), and the like is dissolved or dispersed in water, whereby an aqueous solution or an aqueous dispersion is prepared as the film formation material.

The dissolution step is a step in which the film formation material is prepared with the PVA resin composition dissolved or dispersed in water substantially without undissolved matter.

A normal-temperature dissolution method, a high-temperature dissolution method or a pressure dissolution method is typically employed in the dissolution step of dissolving the PVA resin composition in water. Particularly, the high-pressure dissolution method and the pressure dissolution method are preferred because these methods reduce the amount of undissolved matter and ensure a higher productivity.

The dissolution temperature in the high-temperature dissolution method is typically 80° C. to 100° C., preferably 90° C. to 100° C., and the dissolution temperature in the pressure dissolution method is typically 80° C. to 130° C., preferably 90° C. to 120° C. The dissolution period is properly adjusted depending on the dissolution temperature and the pressure for the dissolution, but is typically 1 to 20 hours, preferably 2 to 15 hours, particularly preferably 3 to 10 hours. If the dissolution period is excessively short, the undissolved matter tends to remain. If the dissolution period is excessively long, the productivity tends to be reduced.

In the dissolution step, a paddle, a full-zone stirring blade, a max-blend stirring blade, a twister, an anchor stirring blade, a ribbon, a propeller or the like is used as a stirring blade.

After the dissolution, the resulting PVA resin aqueous solution is defoamed. Exemplary methods for the defoaming include stationary defoaming method, vacuum defoaming method, and biaxial extrusion defoaming method. Particularly, the stationary defoaming method and the biaxial extrusion defoaming method are preferred. The temperature for the stationary defoaming method is typically 50° C. to 100° C., preferably 70° C. to 95° C., and the defoaming period is typically 2 to 30 hours, preferably 5 to 20 hours.

The film formation material preferably has a solid concentration of 10 to 50 wt. %, particularly preferably 15 to 40 wt. %, more preferably 20 to 35 wt. %. If the solid concentration is excessively low, the productivity of the film tends to be reduced. If the solid concentration is excessively high, the film formation material tends to have an excessively high viscosity, requiring a longer period of time for the defoaming. Further, a die line tends to occur in the film in the film formation.

[Casting Step and Drying Step]

In the film formation process, the water content of the PVA film is adjusted to not higher than 15 wt. % through the casting step of forming a film from the film formation material prepared in the dissolution step and, as required, through the drying step of drying the film formation material.

For the film formation, a melt extrusion method or a casting method may be employed, but the casting method is preferred from the viewpoint of the accuracy of the thickness of the film.

The temperature of the film formation material (at an outlet port) immediately before the casting is preferably 60° C. to 98° C., particularly preferably 70° C. to 95° C. If the temperature is excessively low, the film formation material tends to have a higher viscosity, thereby reducing the productivity of the PVA film. If the temperature is excessively high, the film formation material tends to suffer from foaming or the like.

In the drying step of drying the film formation material on the cast surface after the casting, the surface temperature of the cast surface is preferably 50° C. to 110° C., particularly preferably 70° C. to 100° C. If the surface temperature is excessively low, the film tends to have a higher water content due to insufficient drying, thereby suffering from the blocking. If the surface temperature is excessively high, the film formation material is liable to foam, resulting in film formation failure.

Exemplary methods for the drying in the film formation process include: a method in which a heat roll is used for the drying; a method in which hot air is applied onto the film by means of a floating dryer; and a method in which a far infrared device or a dielectric heating device is used for the drying. These methods may be used in combination.

After the film formation material is dried to a water content of not higher than 15 wt. % in the drying step, the resulting PVA film is peeled off from the cast surface (or from the heat roll when the PVA film is dried on the heat roll after being peeled off from the cast surface). The PVA film peeled off from the cast surface (or from the drying heat roll) is cooled in an environment at 10° C. to 35° C.

In the present disclosure, the PVA film may have plain surfaces, but one or both of the surfaces of the PVA film are preferably subjected to a texturing process so as to be imparted with an emboss pattern, a minute uneven pattern, a special engraved pattern or the like for the antiblocking property, the slidability during the processing, and the appearance, and for suppression of adhesion between film products.

The temperature for the texturing process is typically 60° C. to 150° C., preferably 80° C. to 140° C. The pressure for the texturing process is typically 2 to 8 MPa, preferably 3 to 7 MPa. The period for the texturing process depends on the texturing pressure and the film formation rate, but is typically 0.01 to 5 seconds, preferably 0.1 to 3 seconds.

After the texturing process, as required, the PVA film may be subjected to a cooling process for prevention of unintended thermal stretching of the film.

In the present disclosure, the water-soluble film of the present disclosure satisfying the requirement for the specific crystallinity index difference between the front surface and the back surface of the film can be produced by performing a moist heat treatment on the PVA film, particularly by coating a surface of the PVA film with water and heat-treating the resulting PVA film, after the drying step in the film formation process.

A method for coating the surface of the PVA film with water and heat-treating the resulting PVA film will hereinafter be described more specifically.

First, the step of coating the surface of the PVA film with water after the drying will be described.

In the step of coating the surface of the PVA film with water, the PVA film surface may be coated with water alone, or may be coated with a coating liquid containing water as a major component. The coating liquid needs to contain water as the major component in order to control the crystallinity of the PVA film surface. The coating liquid typically has a water content of not lower than 80 wt. %, preferably not lower than 90 wt. %, more preferably not lower than 99 wt. %. If the water content of the coating liquid is excessively low, it tends to be difficult to provide the curling suppressing effect and, hence, the effects of the present disclosure.

Exemplary components to be contained in addition to water in the coating liquid include PVA resin, water-soluble polymer different from the PVA resin, plasticizer, surfactant, filler, antioxidant, perfume, rust preventing agent, colorant, bulking agent, defoaming agent, UV absorber, fluorescent brightener, liquid paraffins, bitter component (e.g., denatonium benzoate or the like), and organic solvent such as alcohol, which may be used alone or in combination.

Exemplary methods for coating the PVA film surface with water include gravure offset coating method, gravure coating method, roll coating method, bar coating method, and spray coating method, which allow for uniform coating of the surface with a proper amount of water. For prevention of dissolution and breakage of the water-soluble film during the coating, the spray coating method and the roll coating method are preferred. Particularly, the spray coating method in which water is sprayed over the PVA film surface for the coating is preferred.

The temperature of water or the coating liquid is typically about 0° C. to about 60° C., preferably 5° C. to 50° C., particularly preferably 10° C. to 40° C.

If the temperature is excessively low, water tends to less effectively penetrate into the film surface, making it difficult to provide the curling suppressing effect. If the temperature is excessively high, the dissolution and the breakage of the water-soluble film are liable to occur.

The coating amount is typically about 0.1 to about 50 g/m$^2$, preferably 0.5 to 10 g/m$^2$, particularly preferably 1.0 to 4 g/m$^2$.

If the coating amount is excessively small, it tends to be difficult to provide the curling suppressing effect and, hence, the effects of the present disclosure. If the coating amount is excessively great, the dissolution and the breakage of the water-soluble film and the foaming tend to occur.

In the spray coating method, a distance between a spray nozzle and the film is typically about 5 to about 100 cm, preferably 10 to 80 cm, particularly preferably 20 to 60 cm.

If the distance is excessively short, the dissolution and the breakage of the water-soluble film tend to occur. If the distance is excessively long, it tends to be difficult to provide the curling suppressing effect and, hence, the effects of the present disclosure.

The droplets of water for the spraying each have a size of 1 to 1,000 μm, preferably 5 to 500 μm, particularly preferably 10 to 300 μm.

If the water droplet size is excessively small, the water droplets are more liable to evaporate and, therefore, the amount of water supplied onto the film surface tends to be reduced. If the water droplet size is excessively great, the coating tends to be uneven, making it difficult to sufficiently provide the curling suppressing effect.

In the present disclosure, it is preferred that, where one of two opposite surfaces of the PVA film contacts the cast surface (a metal surface of an endless belt or a drum roll, or the like), the other surface of the PVA film is coated with water after the drying step.

Next, the heat treatment step to be performed after the surface coating with water will be described.

In the present disclosure, the heat treatment step is different from the drying step in the film formation process. In the heat treatment, the film is imparted with a proper thermal history after being surface-coated with water. Thus, the heat treatment is performed to stabilize the crystalline state of the film surface controlled by the precedent surface coating step.

In a conventional heat treatment method, the PVA film preliminarily imparted with a given PVA crystalline state in the film formation process is heat-treated for the control of the crystallinity. Therefore, a short-term curling suppressing effect can be provided, but a long-term curling suppressing effect is insufficient.

Therefore, it is important to impart the PVA film with a proper thermal history after coating the PVA film with water.

A time distance between the surface coating with water and the heat treatment is preferably 1 to 120 seconds, particularly preferably 2 to 60 seconds, more preferably 3 to 40 seconds. If the time distance is excessively long, the dissolution and the breakage of the water-soluble film tends to occur. If the time distance is excessively short, the effect of the surface coating tends to be reduced, making it difficult to provide the curling suppressing effect.

The temperature for the heat treatment is preferably 80° C. to 130° C., particularly preferably 85° C. to 125° C., more preferably 90° C. to 120° C. If the heat treatment temperature is excessively high, the film tends to have an insufficient seal strength and a lower solubility. If the heat treatment temperature is excessively low, the amount of heat supplied to the film tends to be reduced, making it difficult to provide the long-term curling suppressing effect.

The period for the heat treatment is preferably 0.1 to 60 seconds, particularly preferably 0.5 to 20 seconds, more preferably 1 to 10 seconds. If the heat treatment period is excessively long, the film tends to have an insufficient seal strength and a lower solubility. If the heat treatment period is excessively short, the amount of heat supplied to the film tends to be reduced, making it difficult to provide the long-term curling suppressing effect.

The heat treatment is preferably performed at a higher temperature for a shorter period in order to suppress the reduction in film solubility and to improve the productivity. The heat treatment is preferably performed at 85° C. to 125° C. for 0.5 to 20 seconds, particularly preferably at 90° C. to 120° C. for 1 to 10 seconds.

The heat-treated film typically has a water content of 3 to 15 wt. %, preferably 5 to 14 wt. %, particularly preferably 8 to 11 wt. %. If the water content is higher, the blocking is liable to occur. If the water content is excessively low, the film tends to be excessively hard.

Exemplary methods for the heat treatment after the surface coating with water include: (a) a method in which the film is brought into contact with a heated metal roll (heat roll) after the surface coating with water; (b) a method in which the film is brought into contact with a heated metal plate after the surface coating with water; (c) a method in which hot air is applied over the film after the surface coating with water; and (d) a method in which the film is heated by infrared irradiation, far infrared irradiation or high-frequency dielectric heating after the surface coating with water. Particularly, the heat treatment methods (a) and (b) of the contact type are preferred, because the heat treatment of the coated film surface can be easily directly controlled. A plurality of heat rolls may be used for the heat treatment.

In the present disclosure, a film surface to be subjected to the heat treatment in the heat treatment step following the coating step is preferably the same as the film surface coated with water. Particularly, the film surface coated with water is preferably brought into contact with a portion of a heat treatment apparatus such as the heat roll or the metal plate to be thereby subjected to the heat treatment for the suppression of the curling of the film.

[Other Process Steps]

In the production of the water-soluble film of the present disclosure, as required, a winding step, a packaging step, a storage step, and a transportation step are performed after the production process.

In the winding step, the PVA film (water-soluble film) formed and moist-heat-treated is transported and wound around a core pipe (S1) into a film roll. The resulting film roll may be supplied as a product on an as-is basis. Preferably, the PVA water-soluble film thus wound up may be slit to a desired width, then wound up again around a core pipe (S2) having a length corresponding to the desired film width, and supplied in the form of a film roll having a desired size.

The water-soluble film of the present disclosure thus produced is less susceptible to the curling and the sealing failure even after long-term storage. Therefore, the water-soluble film is useful for various packaging applications, e.g., for unit package applications for packaging chemical agents such as agricultural chemicals and detergents.

<Water-Soluble Film for Packaging Chemical Agent>

The water-soluble film of the present disclosure can be particularly advantageously used as a chemical agent packaging water-soluble film for packaging a chemical agent. Preferred examples of the chemical agent packaging water-soluble film include detergent packaging water-soluble film and agricultural chemical packaging water-soluble film. A liquid detergent packaging water-soluble film is particularly preferred.

Examples of the chemical agent include agricultural chemicals such as pesticide, disinfectant, and herbicide, fertilizer, and detergents such as laundry detergent and dishwashing detergent. Particularly, the detergents are preferred. The form of the chemical agent may be liquid or solid. The liquid chemical agent is liquid. The viscosity of the liquid chemical agent is not particularly limited, as long as the liquid chemical agent is fluid and conformable to the shape of a container. The viscosity of the liquid chemical agent is preferably 10 to 200 mPa·s. The viscosity of the liquid chemical agent is measured at an ordinary temperature by means of B-type rotary viscometer. The solid chemical agent may be in a granular form, a tablet form or a powdery form. The chemical agent is preferably dissolved or dispersed in water for use.

The pH of the chemical agent may be alkaline, neutral or acidic. The liquid detergent preferably has a pH of 6 to 12, particularly preferably 7 to 11, when being dissolved or dispersed in water. The liquid detergent preferably has a water content of not higher than 15 wt. %, particularly preferably 0.1 to 10 wt. %, more preferably 0.1 to 7 wt. %.

The pH is measured in conformity with JIS K3362 8.3, and the water content is measured in conformity with JIS K3362 7.21.3.

<Chemical Agent Package>

A chemical agent package of the present disclosure includes a package bag formed from the water-soluble film, and any of the aforementioned chemical agents contained in the package bag. The chemical agent is packaged with the water-soluble film and, therefore, when the chemical agent package is put in water, the water-soluble film is dissolved in water, and then the chemical agent is dissolved or dispersed in water to exhibit its effect. The chemical agent package is used in such an application. Accordingly, the chemical agent package is advantageously used as a unit chemical agent package in which a relatively small amount (e.g., a single dose) of a chemical agent is packaged.

Particularly, the chemical agent package of the present disclosure is advantageously used as a liquid detergent portion package. The chemical agent package of the present disclosure in which the liquid detergent is packaged is designed so that the chemical agent package maintains its shape with the liquid detergent contained therein during the storage thereof and, when the chemical agent package is used (for laundry washing), the package bag (water-soluble film) is brought into contact with water to be dissolved in water, whereby the contained liquid detergent flows out of the package bag.

The chemical agent package of the present disclosure is produced by bonding edge portions of two water-soluble films cut in a square or round shape to prepare a package bag and filling the package bag with the chemical agent. The chemical agent package typically has an edge length (diameter) of 10 to 50 mm, preferably 20 to 40 mm. The water-soluble films to be used for the package bag typically each have a thickness of 10 to 120 μm, preferably 15 to 110 μm, more preferably 20 to 100 μm. The amount of the chemical agent (e.g., the liquid detergent) to be contained in the package bag is typically 5 to 50 mL, preferably 10 to 40 mL.

A known method may be used for the production of the package bag for packaging the chemical agent with the use of the water-soluble film of the present disclosure. Examples of the known method include: (1) heat sealing method; (2) water sealing method; and (3) adhesive sealing method, among which the water sealing method (2) is versatile and advantageous.

The chemical agent package of the present disclosure typically has a smooth surface. However, the outer surface of the package bag (water-soluble film) may be textured so as to be imparted with an emboss pattern, minute uneven pattern, a special engraved pattern or the like for the antiblocking property, the slidability during processing, and the appearance, and for suppression of adhesion between products (packages).

EXAMPLES

The embodiments of the present disclosure will hereinafter be described more specifically by way of examples thereof. However, it should be understood that the present disclosure be not limited to the examples within the scope of the present disclosure.

In the following examples, "parts" and "%" are based on weight.

Example 1

A PVA resin aqueous solution was prepared by mixing and dissolving 90 parts of a carboxyl-modified PVA (A1) having a 4% aqueous solution viscosity of 22 mPa·s as measured at 20° C., an average saponification degree of 94 mol %, and a monomethyl maleate modification degree of 2.0 mol % and 10 parts of an unmodified PVA (A2) having a 4% aqueous solution viscosity of 18 mPa·s as measured at 20° C. and an average saponification degree of 88 mol % as the PVA resin (A), 20 parts of sorbitol (b1) and 20 parts of glycerin (b2) as the plasticizer (B), 8 parts of starch (having an average particle diameter of 20 μm) as the filler (C), and 0.2 parts of a polyoxyalkylene alkyl ether phosphate monoethanolamine salt as the surfactant (D) in water. The PVA resin aqueous solution had a solid concentration of 30% with the starch dispersed therein.

Then, a PVA film (having a film width of 1,000 mm, a film length of 300 m, and a film thickness of 76 μm) was produced by casting the PVA resin aqueous solution by the casting film formation method by means of a belt film formation apparatus including a stainless steel endless belt, and drying the PVA resin aqueous solution at a temperature of 95° C. for 4 minutes.

Subsequently, ion-exchanged water was sprayed in a water coating amount of 3.1 g/m² at a water temperature of 20° C. on an evaporation surface of the dried PVA film from a water spray bottle having a volume of 500 cc with a spray nozzle of the water spray bottle spaced a distance of 40 cm from the film, whereby the surface of the PVA film was coated with water. Thereafter, the resulting PVA film was allowed to stand still at a room temperature (23° C.) for 20 seconds, and then the surface of the PVA film coated with water by the spraying was brought into contact with a metal plate having a surface temperature controlled at 110° C. In this state, the PVA film is heat-treated at 110° C. for 2 seconds. Thus, a water-soluble film having a water content of 10% was produced.

The crystallinity indexes of opposite surfaces of the water-soluble film thus produced were determined as represented by the aforementioned expression (1) based on measurement through the infrared spectroscopic analysis by the attenuated total reflection method (ATR method). As a result, the crystallinity indexes were Xa=0.597 and Xb=0.555, respectively, and a difference Xa−Xb was 0.042.

[Curling Property]

(Evaluation Method)

A test sample film having a machine direction (MD) dimension of 160 mm and a transverse direction (TD) dimension of 120 mm was cut out of the water-soluble film produced in the aforementioned manner. After the test sample film was suspended with its TD edge fixed as shown in FIG. 1 at 23° C. at 50% RH for 10 days, the curl diameters (R) of the test sample film were measured as viewed from below for evaluation. Where the curl diameters (R) on opposite edges of the test sample film were different from each other, a smaller one of the curl diameters (R) was used for the evaluation.

Where the curl shape was a perfect circle, the diameter of the perfect circle was defined as the curl diameter (R). Where the curl shape was an oval, the average of the major diameter and the minor diameter of the oval [(Major diameter+Minor diameter)/2] was defined as the curl diameter (R). Based on the curl diameter (R) thus determined, the test sample film was evaluated with reference to the following criteria:

(Evaluation Criteria)
3: No curling was observed with no curl diameter.
2: Film curling deformation was gentle with a curl diameter (R) of not less than 15 mm.
1: Film curling deformation was severe with a curl diameter (R) of less than 15 mm.

[State of Treated Film]
(Evaluation Method)
The state of the film immediately after the surface coating with water and the heat treatment was visually evaluated based on three-level evaluation criteria, and the evaluation results are shown in Table 1.

(Evaluation Criteria)
3: Film appearance and coated surface state were both excellent.
2: Film appearance was excellent, but coated surface was adhesive and susceptible to blocking.
1: Film was foamed.

Example 2

A PVA water-soluble film having a water content of 8.5% was produced in substantially the same manner as in Example 1, except that the water coating amount was changed to 1.55 g/m². The crystallinity indexes of opposite surfaces of the PVA water-soluble film thus produced were determined as represented by the aforementioned expression (1) based on measurement through the infrared spectroscopic analysis by the attenuated total reflection method (ATR method). As a result, the crystallinity indexes were Xa=0.559 and Xb=0.543, respectively, and a difference Xa−Xb was 0.016.

The water-soluble film was evaluated for the curling property and the film state in the same manner as in Example 1. The results are shown in Table 1.

Example 3

A PVA water-soluble film having a water content of 11.4% was produced in substantially the same manner as in Example 1, except that the water coating amount was changed to 4.65 g/m². The crystallinity indexes of opposite surfaces of the PVA water-soluble film thus produced were determined as represented by the aforementioned expression (1) based on measurement through the infrared spectroscopic analysis by the attenuated total reflection method. (ATR method). As a result, the crystallinity indexes were Xa=0.572 and Xb=0.514, respectively, and a difference Xa−Xb was 0.058. The water-soluble film was evaluated for the curling property and the film state in the same manner as in Example 1. The results are shown in Table 1.

Comparative Example 1

A PVA water-soluble film having a water content of 7% was produced in substantially the same manner as in Example 1, except that neither the surface coating with water the heat treatment was performed. The crystallinity indexes of opposite surfaces of the PVA water-soluble film thus produced were determined as represented by the aforementioned expression (1) based on measurement through the infrared spectroscopic analysis by the attenuated total reflection method (ATR method). As a result, the crystallinity indexes were Xa=0.578 and Xb=0.577, respectively, and a difference Xa−Xb was 0.001.

The water-soluble film was evaluated for the curling, property and the film state in the same manner as in Example 1. The results are shown in Table 1

Comparative Example 2

A PVA water-soluble film having a water content of 7% was produced in substantially the same manner as in Example 1, except that the surface coating with water was not performed. The crystallinity indexes of opposite surfaces of the PVA water-soluble film thus produced were determined as represented by the aforementioned expression (1) based on measurement through the infrared spectroscopic analysis by the attenuated total reflection method (ATR method). As a result, the crystallinity indexes were Xa=0.575 and Xb=0.562, respectively, and a difference Xa−Xb was 0.013.

The water-soluble film was evaluated for the curling property and the film state in the same manner as in Example 1. The results are shown in Table 1.

Comparative Example 3

A PVA water-soluble film having a water content of 10% was produced in substantially the same manner as in Example 1, except that the heat treatment was not performed. The crystallinity indexes of opposite surfaces of the PVA water-soluble film thus produced were determined as represented by the aforementioned expression (1) based on measurement through the infrared spectroscopic analysis by the attenuated total reflection method (ATR method). As a result, the crystallinity indexes were Xa=0.550 and Xb=0.550, respectively, and a difference Xa−Xb was 0.000.

The water-soluble film was evaluated for the curling property and the film state is the same manner as in Example 1. The results are shown in Table 1.

Comparative Example 4

An attempt was made to produce a film in substantially the same manner as in Example 1, except that the water coating amount was changed to 65 g/m². However, it was impossible to produce a normal film due to foaming.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Film formation material (parts) | | | | | | | |
| PVA | 100 | 100 | 100 | 100 | 100 | 100 | 100 |
| Glycerin | 20 | 20 | 20 | 20 | 20 | 20 | 20 |
| Sorbitol | 20 | 20 | 20 | 20 | 20 | 20 | 20 |

TABLE 1-continued

|  | Example 1 | Example 2 | Example 3 | Comparative Example 1 | Comparative Example 2 | Comparative Example 3 | Comparative Example 4 |
|---|---|---|---|---|---|---|---|
| Treatment | | | | | | | |
| Surface coating with water | Done (3.1 g/m$^2$) | Done (1.55 g/m$^2$) | Done (4.65 g/m$^2$) | Undone | Undone | Done (3.1 g/m$^2$) | Done (65 g/m$^2$) |
| Heat treatment | Done | Done | Done | Undone | Done | Undone | — |
| Crystallinity indexes | | | | | | | |
| Xa | 0.597 | 0.559 | 0.572 | 0.578 | 0.575 | 0.550 | — |
| Xb | 0.555 | 0.543 | 0.514 | 0.577 | 0.562 | 0.550 | — |
| Xa − Xb | 0.042 | 0.016 | 0.058 | 0.001 | 0.013 | 0.000 | — |
| Evaluation | | | | | | | |
| Curling property | 3 | 3 | 3 | 1 | 1 | 1 | Not evaluated |
| Film state | 3 | 3 | 2 | 3 | 3 | 2 | 1 |

The water-soluble films of Examples 1 to 3 of the present disclosure were excellent in curling suppressing effect with lower curling degrees thereof even after the long-term storage, and were excellent in film appearance. In contrast, the water-soluble films of Comparative Examples 1, 2, and 3 which did not satisfy the requirement for the crystallinity index difference defined by the present disclosure suffered from significant curling after the long-term storage, and were poorer in storage stability. Further, Comparative Example 4 which used an excess amount of water for the surface coating suffered from the foaming of the coated film, failing to provide a normal film.

It is obvious that chemical agent packages produced by using the water-soluble films of Examples 1 to 3 each satisfying the requirement defined by the present disclosure are excellent in appearance.

While specific forms of the embodiments of the present disclosure have been shown in the aforementioned examples, the examples are merely illustrative but not limitative. It is contemplated that various modifications apparent to those skilled in the art could be made within the scope of the disclosure.

The water-soluble film of the present disclosure is less susceptible to the curling even after the long-term storage. Therefore, the water-soluble film allows for proper sealing substantially without displacement when being used for production of a package. Particularly, the water-soluble film is useful for water-soluble film applications (unit packaging applications for chemical agents such as agricultural agents and detergents), and for (water pressure) transfer films, sanitary supplies such as sanitary napkins and disposable diapers, waste disposal supplies such as ostomy bags, medical supplies such as blood-absorbing sheets, and temporary base materials for seeding sheets, seeding tapes, and embroidery bases.

The invention claimed is:

1. A water-soluble film, comprising a polyvinyl alcohol resin (A), and having a first surface, which has a crystallinity index Xa, and a second surface, which is opposite to the first surface and has a crystallinity index Xb, wherein:
the film is water-soluble such that the film dissolves in water at a temperature of 20° C.;
Xa>Xb;
a difference Xa−Xb is from 0.030 to 0.10; and
the crystallinity indexes Xa and Xb are each measured through an infrared spectroscopic analysis by an attenuated total reflection method and represented by:

$ABS_{1141}/ABS_{1093}$, wherein:
$ABS_{1141}$ is an absorbance at a wavenumber of 1141 cm$^{-1}$; and
$ABS_{1093}$ is an absorbance at a wavenumber of 1093 cm$^{-1}$.

2. The water-soluble film according to claim 1, further comprising a plasticizer (B).

3. The water-soluble film according to claim 2, wherein the plasticizer (B) is present in a proportion of 5 parts by weight or more based on 100 parts by weight of the polyvinyl alcohol resin (A).

4. The water-soluble film according to claim 1, further comprising a filler (C).

5. The water-soluble film according to claim 4, wherein the filler (C) is present in a proportion of 1 to 30 parts by weight based on 100 parts by weight of the polyvinyl alcohol resin (A).

6. The water-soluble film according to claim 1, wherein the polyvinyl alcohol resin (A) comprises an anion group-modified polyvinyl alcohol resin (a1).

7. The water-soluble film according to claim 1, further comprising a surfactant (D).

8. The water-soluble film according to claim 7, wherein the surfactant (D) is present in a proportion of 0.01 to 3 parts by weight based on 100 parts by weight of the polyvinyl alcohol resin (A).

9. The water-soluble film according to claim 1, further comprising a plasticizer (B), a filler (C), and a surfactant (D), wherein the polyvinyl alcohol resin (A) comprises an anion group-modified polyvinyl alcohol resin (a1).

10. The water-soluble film according to claim 9, comprising, based on 100 parts by weight of the polyvinyl alcohol resin (A):

5 parts by weight or more of the plasticizer (B);
1 to 30 parts by weight of the filler (C); and
0.01 to 3 parts by weight of the surfactant (D).

11. The water-soluble film according to claim 1, wherein a thickness of the water-soluble film is 10 to 120 μm.

12. The water-soluble film according to claim 10, wherein a thickness of the water-soluble film is 10 to 120 μm.

13. A method of producing the water-soluble film according to claim 1, the method comprising, in the following order:

forming a polyvinyl alcohol film comprising a polyvinyl alcohol resin (A);

coating a surface of the polyvinyl alcohol film with water; and heat-treating the resulting polyvinyl alcohol film.

14. A chemical agent package, comprising:

a package bag formed from the water-soluble film according to claim 1; and a chemical agent packaged in the package bag.

15. The chemical agent package according to claim 14, wherein the chemical agent is a detergent.

16. The chemical agent package according to claim 14, wherein the chemical agent is a liquid detergent.

17. A method of producing the chemical agent package according to claim 14, comprising packaging the chemical agent with the use of the water-soluble film.

* * * * *